(12) United States Patent
Gendler

(10) Patent No.: US 8,281,078 B2
(45) Date of Patent: Oct. 2, 2012

(54) MULTI-LEVEL CACHE PREFETCH

(75) Inventor: Alexander Gendler, Kiriat Motzkia (IL)

(73) Assignee: Intel Corporation, Santa Clara, CA (US)

( * ) Notice: Subject to any disclaimer, the term of this patent is extended or adjusted under 35 U.S.C. 154(b) by 270 days.

(21) Appl. No.: 12/569,891

(22) Filed: Sep. 29, 2009

(65) Prior Publication Data

US 2011/0078380 A1     Mar. 31, 2011

(51) Int. Cl.
*G06F 12/00* (2006.01)
(52) U.S. Cl. .......................... 711/137; 711/119; 711/122
(58) Field of Classification Search ........................ None
See application file for complete search history.

(56) References Cited

U.S. PATENT DOCUMENTS

| | | | |
|---|---|---|---|
| 2004/0268050 A1* | 12/2004 | Cai et al. | 711/137 |
| 2006/0143401 A1* | 6/2006 | Doweck et al. | 711/137 |
| 2008/0250208 A1* | 10/2008 | O'Connell et al. | 711/137 |

* cited by examiner

*Primary Examiner* — Than Nguyen
(74) *Attorney, Agent, or Firm* — Blakely, Sokoloff, Taylor & Zafman LLP

(57) ABSTRACT

Methods and apparatus relating to multi-level cache prefetch are described. In some embodiments, a data parking logic updates a prefetch request with one or more bits based on the status of a request queue. The one or more bits may in turn cause the corresponding prefetched data to be stored in one of at least two caches. Other embodiments are also described and claimed.

20 Claims, 7 Drawing Sheets

MULTI-LEVEL CACHE PREFETCH

FIELD

The present disclosure generally relates to the field of electronics. More particularly, an embodiment of the invention relates to multi-level cache prefetch.

BACKGROUND

To improve performance, some processors may access data that is stored in a cache. Generally, data stored in a cache may be accessed more quickly than data stored in a main system memory. In some implementations, multiple levels of cache may be present, for example, with each level having a different size and/or access speed. Accordingly, system performance may be dependent on how the cache or its multiple levels are used.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof. Also, even though some embodiments discussed herein may refer to a set or clear value as logical 0 and 1, respectively, these terms are interchangeable, e.g., depending on the implementation. Also, the use of "instruction" or "micro-operation" (which may also be referred to as "uop") herein may be interchangeable.

Some embodiments may allow for storing (or parking) of data in one or more cache levels for a time period (e.g., temporarily or for select time period). For example, in embodiments with multi-level (e.g., at least two level) caches, a first cache (e.g., a level 1 (L1) cache) may be relatively small and fast, whereas a second cache, having a higher level than the first cache (e.g., a level 2 (L2) cache), may be relatively big and slow. Rather than throttling prefetch operations, some embodiments allow for aggressive prefetch operations (e.g., where data is copied (or prefetched) from a memory (such as a system memory; see, e.g., memory 512 of FIG. 5, into a cache that is closer to the processor/core than the main/system memory) without polluting the relatively small/faster cache with the data that may not be used or that may be required much later. Also, copying such data (that may not be used or used much later) may increase data traffic on critical data buses closer to processor core(s) and some embodiments may reduce or eliminate such traffic on the critical data buses.

In an embodiment, a data parking engine may mark (e.g., with an indicia, such as an address or cache level device or level identifier) where the requested data (such as a cache line or block (or more generally one or more bits)) should be parked. As a result, prefetch lines that are determined to be used soon may be stored in a small/faster cache and prefetch lines that are determined to be used later to a bigger/slower cache.

Figure 3:
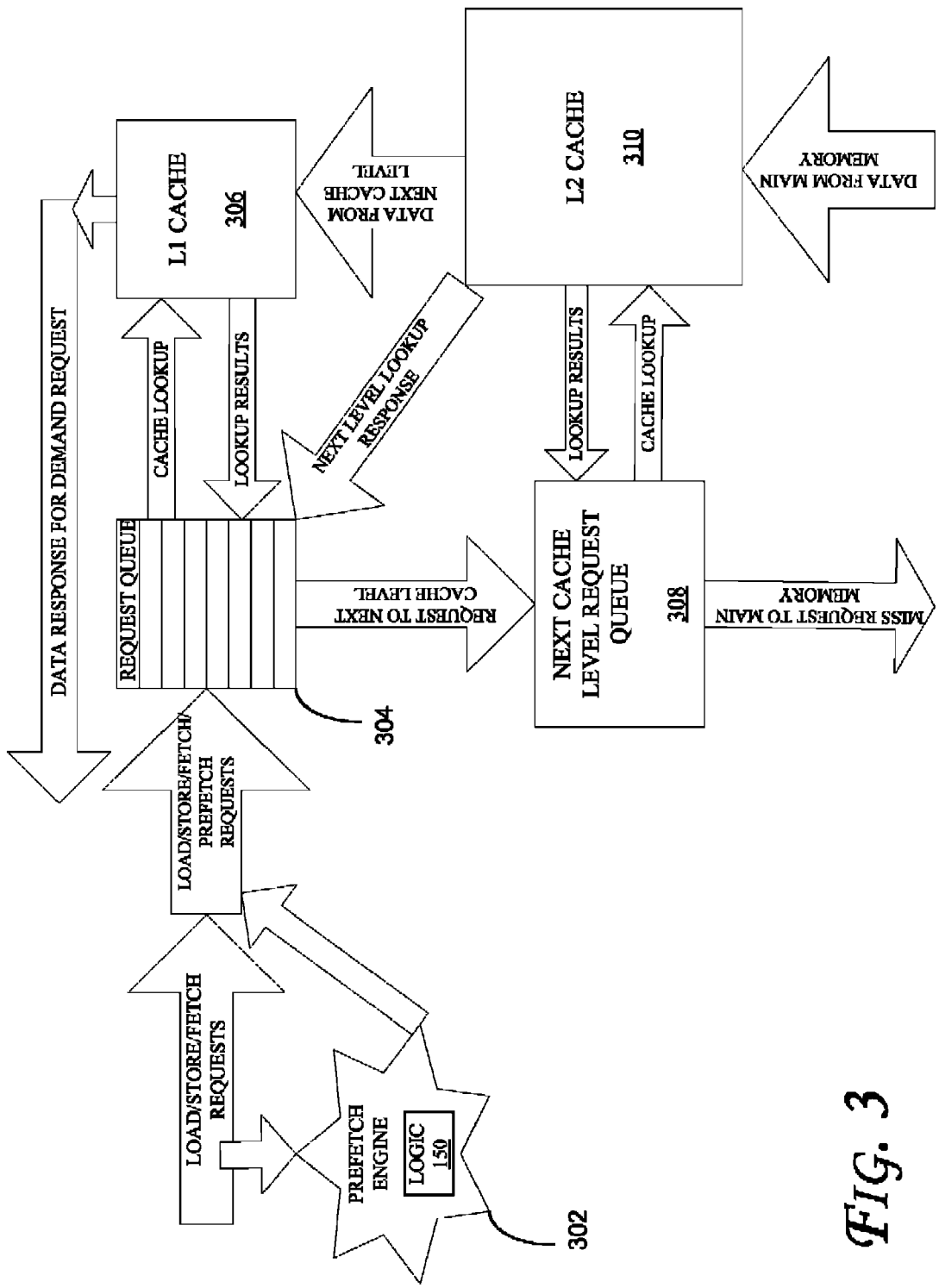

Also, in some embodiments, prefetch requests (e.g., initiated by a prefetch engine in response to a prefetch trigger or signal) may be stored in a request queue. Generally, a request queue may store data requests that are to be stored in a corresponding cache level. Because the request to the line (or other portion of the storage device or cache) that will be parked in bigger cache will not wait for the data return, the corresponding entry in the request queue (e.g., corresponding to L1 cache) will be occupied for a shorter time, in turn, improving occupancy problems of the request queue. Also, in some embodiments, more than one request queue may be present (e.g., one for each cache or group of caches) such as shown in FIG. 3.

Figure 1:
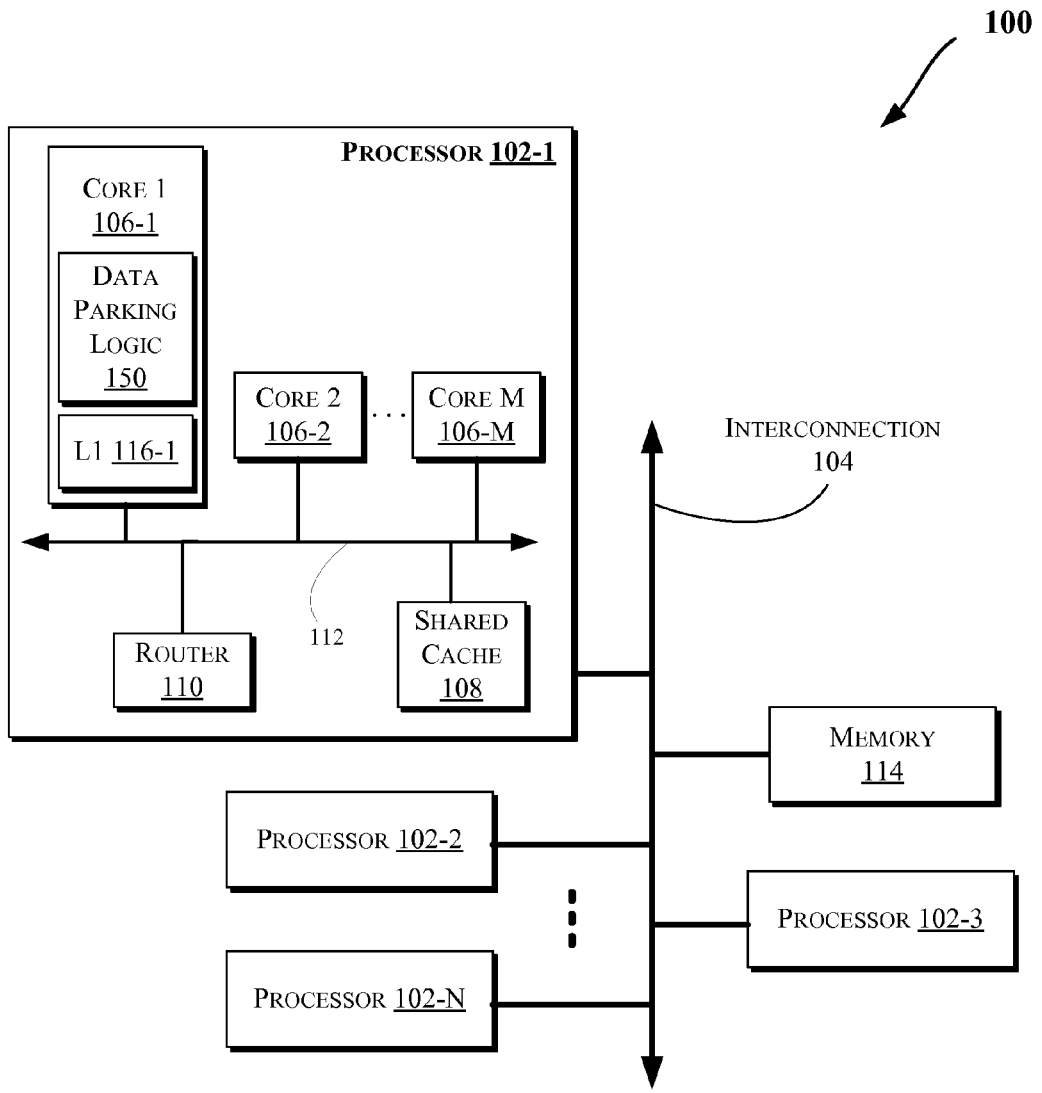
FIGS. 1 and 5-6 illustrate block diagrams of embodiments of computing systems, which may be utilized to implement various embodiments discussed herein.

Techniques described herein may allow for improved performance in various computing devices, such as those discussed for example with reference to FIGS. 1-7. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection network or bus 104. Each processor may include various components, some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106" or more generally as "core 106"), a shared cache 108, and/or a router 110. The processor cores 106 may be implemented on a single integrated circuit (IC) chip. Moreover, the chip may include one or more shared and/or private caches (such as cache 108), buses or interconnections (such as a bus or interconnection network 112), memory controllers (such as those discussed with reference to FIGS. 5 and 6), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The shared cache 108 may store data (e.g., including instructions) that are utilized by one or more components of the processor 102-1, such as the cores 106. For example, the shared cache 108 may locally cache data stored in a memory 114 for faster access by components of the processor 102. In an embodiment, the cache 108 may include a mid-level cache (MLC) (such as a level 2 (L2), a level 3 (L3), a level 4 (L4), or other levels of cache), a last level cache (LLC), and/or combinations thereof. Moreover, various components of the processor 102-1 may communicate with the shared cache 108 directly, through a bus (e.g., the bus 112), and/or a memory controller or hub. As shown in FIG. 1, in some embodiments, one or more of the cores 106 may include a level 1 (L1) cache (116-1) (generally referred to herein as "L1 cache 116") and/or an L2 cache (not shown).

Also, processor 102-1 may include a prefetch engine (not shown) which may prefetch data from memory 114 (or another cache level) into one of the caches discussed above. As shown, processor core 106 may include a data parking logic 150 which will be further discussed herein, e.g., with reference to FIGS. 3-4. Furthermore, even though some figures illustrate logic 150 to be inside a processor or core, logic 150 may be provided within other components of computing systems discussed herein, such as within components of systems discussed with reference to FIG. 1, 5, or 6.

Figure 2:
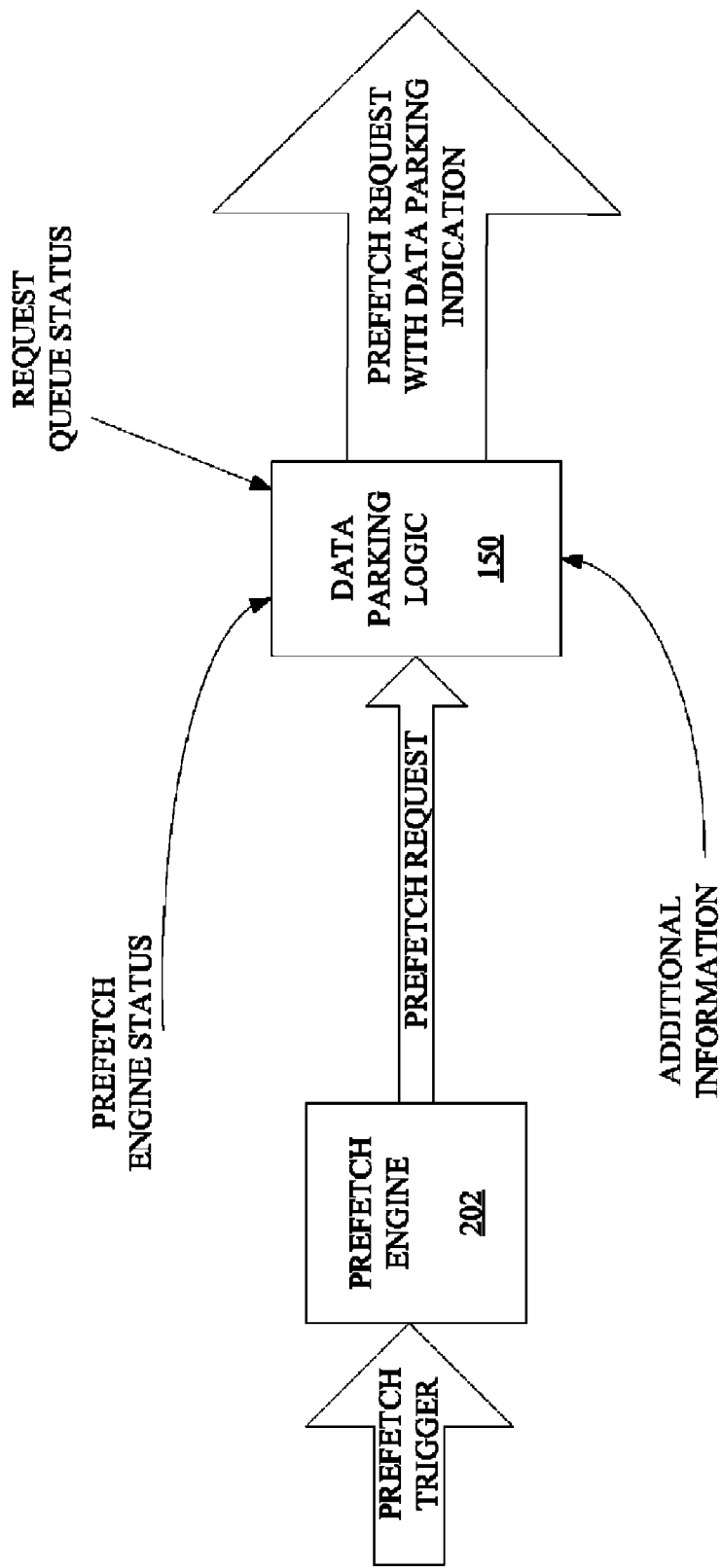
FIGS. 2-4B illustrate flow and block diagrams associated with prefetch operations, in accordance with some embodiments.

FIG. 2 illustrates a block diagram of prefetch operations, according to an embodiment. As shown, a prefetch engine 202 generates a prefetch request in response to a prefetch trigger (which is interchangeably referred to herein as "demand request". The prefetch request(s) are stored in a request queue as will be further discussed with reference to FIG. 3. Also, in one embodiment, the prefetch engine 202 issues prefetch requests, based on at least a demand request or prefetch request from a lower cache level, e.g., ahead of the demand requests to cause data to be stored in another cache level (e.g., higher than the aforementioned lower cache). The data parking logic 150 receives the prefetch request and generate a corresponding prefetch request with data parking indicia (such as an address or cache level device or level identifier), e.g., based on one or more of: (1) prefetch engine status (e.g., level of prefetch aggressiveness, level of prefetch throttling or other prefetch parameter); (2) request queue status (e.g., based on how full or empty the request queue is); and/or (3) additional information (e.g., number of requests in some request queue state, number of prefetch requests or demand requests in request queue, etc.).

Generally, prefetching improves performance by reducing latency associated with fetching data from main/system memory because the prefetched data is already stored in a cache. Techniques discussed herein may be applied to different prefetching algorithms. In an embodiment, the prefetch engine 202 may include one or more detectors (not shown). Each detector may track demand requests corresponding to the same physical page/line/block (or another portion of storage). Based on the demand requests, the prefetch engine 202 issues prefetch data requests that run ahead of the demand requests and cause the data to be stored in MLC or LLC (or another level). This allows to the detector(s) to send the prefetch requests much farther ahead than the demand requests. When distance between the current demand request and the latest prefetch request become too big, the prefetch request may not be issued until distance between them reaches a threshold.

In some embodiments, at least two different levels of "demand to prefetch distance" (the distance) may be used. First level of the distance is for relatively close addresses of the demand and the prefetch requests. Second level is for distances that are bigger than the first level (but may be smaller than some higher boundary or threshold). Of course more than two levels of distance may be used for finer control.

Referring to FIG. 3, which illustrates a block diagram of prefetch operations, according to an embodiment, load/store/fetch requests or demands (which may also include prefetch request(s) from lower cache level(s) in some embodiments) may be received at a prefetch engine 302 and a request queue 304. As shown, the prefetch engine 302 may include the logic 150 in an embodiment. The engine 302 generates the prefetch requests, such as discussed above and with indicia generated by the logic 150. The prefetch requests are then forwarded to the request queue 304.

As illustrated in FIG. 3, the prefetch requests issued from the first level of the distance may behave as follows: they will occupy entries in the request queue 304, cause issuing of request to next Cache Level 310 for the requested data (e.g., through request queue 308, which may generated a miss from cache 310 and cause a request to main memory), wait until acknowledgement is received from next Cache Level 310 (e.g., such as a Global Observation (GO) returns (for example, where GO may be an indication that the request is accepted and source that will supply the data is found) and the data returns), and will write the data into the current Cache level 306 and then will be finished.

Furthermore, the prefetch request that issued from the second level of the distance will behave differently, for example as follows: they will occupy entries in request queue 304, cause issuing of request to next Cache Level 310 for the requested data (e.g., through request queue 308), wait for acknowledgement from next Cache Level 310 (e.g., GO), remove the corresponding entry from request queue 304, and then will be finished.

In some embodiments, the request data for the prefetcher request from second level will be parked in Next Cache Level 310 and will not be brought to current Cache level 306. Accordingly, the current cache 306 will not be polluted with data that may be used by the distant demand request. Also, the bus from the Next Cache Level 310 can be used for different data transfers and the entry of the request queue 304 will be released earlier which will allow for issuance of more requests from the request queue 304.

Furthermore, indication/signal from the request queue status may be used by the logic 150 as follows: (1) if the request queue is almost empty (e.g., based on some threshold value comparison), then the first level boundaries may be increased to and more first level prefetch requests are sent; or (2) if the request queue is almost fully occupied (e.g., based on some threshold value comparison), then the second level boundaries are increased and more second level prefetch requests are sent.

Accordingly, in some embodiment, instead of sending less prefetch requests to throttle request queue usage, the same or higher number of requests is sent. All data may be prefetched and parked in relatively bigger/slower cache with the exception of less speculative prefetch data that is prefetched into a relatively smaller/faster cache. Further, prefetch data requests to the bigger cache are de-allocated relatively sooner from request queue (e.g., per GO), when compared with current implementations. Moreover, some embodiments provide a performance boost for both single and multi threaded execution, including single thread streaming.

Figure 4A:
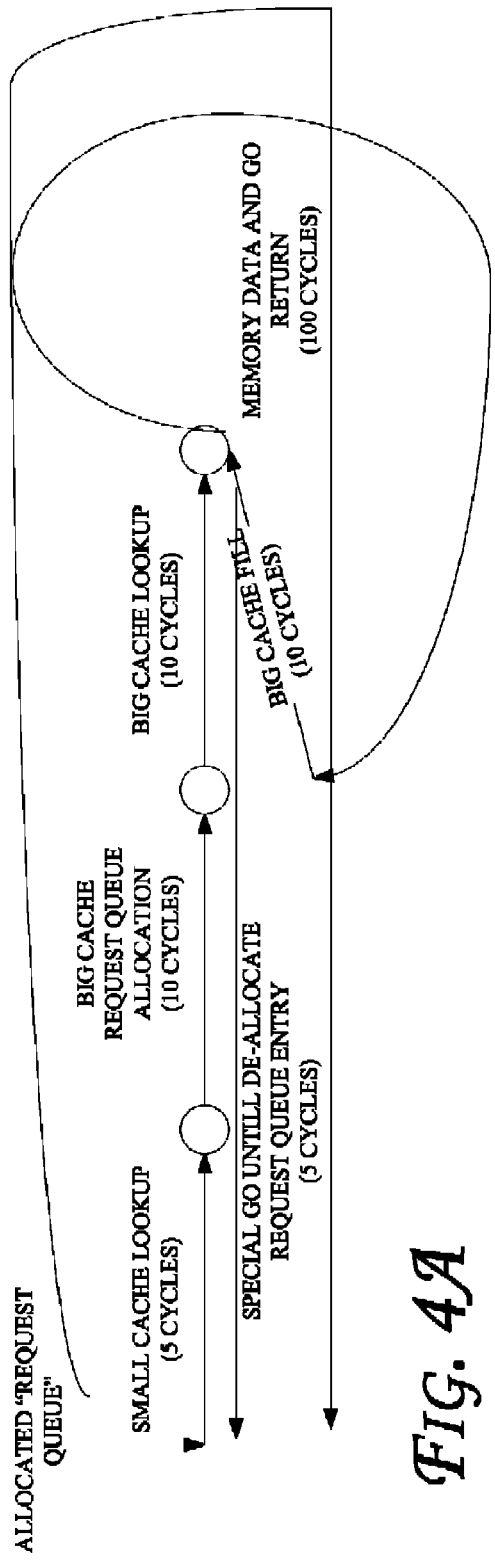
Figure 4B:
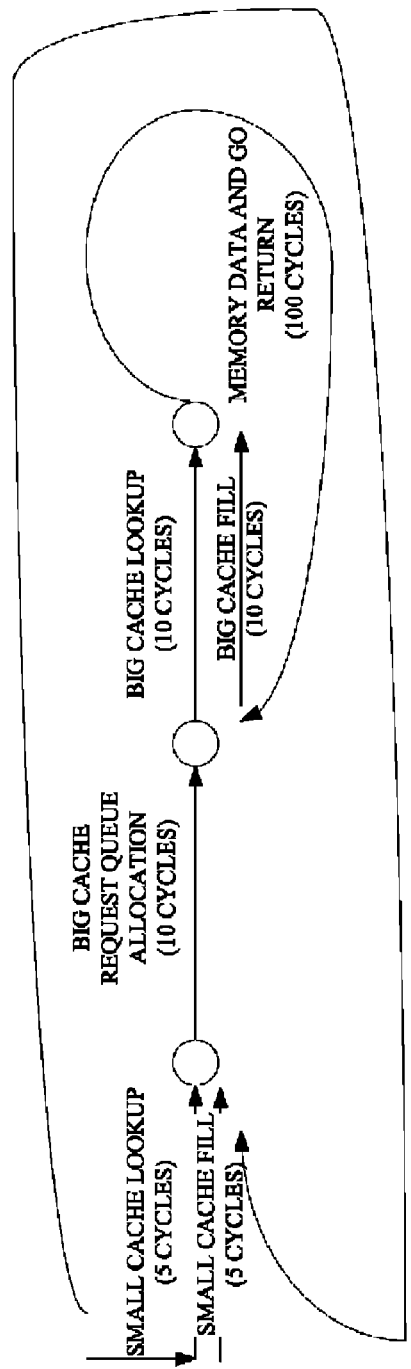

FIG. 4A illustrates a request queue occupancy latency flow diagram with sample cycle counts, according to an embodiment. More particularly, FIG. 4 shows details of big cache (e.g., L2 cache 310 as discussed with reference to FIG. 3) only data parking prefetch data request. For example, the request queue entry occupation time may include: Small Cache Lookup (5)+Big Cache Request Queue Allocation (10)+Big Cache lookup (10)+Special GO till de-allocate request queue entry (5). This results in a total of 30 cycles, whereas a standard prefetch data request (shown in FIG. 4B) may require a total of 130 cycles, e.g., including: Small Cache Lookup (5)+Big Cache Request Queue Allocation (10)+Big Cache lookup (10)+Memory Data and GO return (100)+ Small Cache Fill (5).

Figure 5:
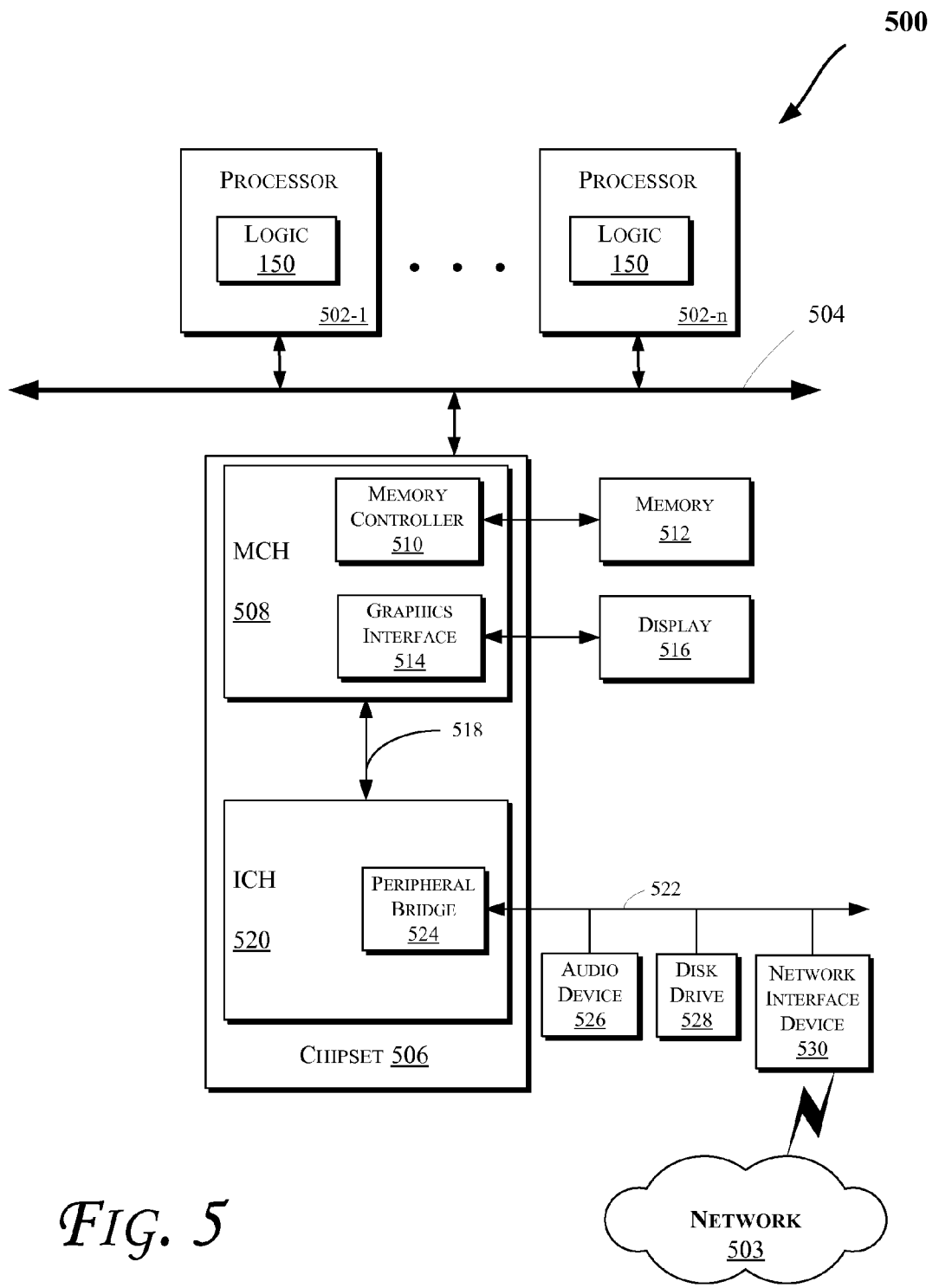

FIG. 5 illustrates a block diagram of a computing system 500 in accordance with an embodiment of the invention. The computing system 500 may include one or more central processing unit(s) (CPUs) 502 or processors that communicate via an interconnection network (or bus) 504. The processors 502 may include a general purpose processor, a network processor (that processes data communicated over a computer network 503), or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. In an embodiment, one or more of the processors 502 may be the same or similar to the processors 102 of FIG. 1. For example, one or more of the processors 502 may include one or more of the caches, storage devices, and/or logic 150 discussed with reference to FIGS. 1-4. Also, the operations discussed with reference to FIGS. 1-4 may be performed by one or more components of the system 500.

A chipset 506 may also communicate with the interconnection network 504. The chipset 506 may include a memory control hub (MCH) 508. The MCH 508 may include a memory controller 510 that communicates with a memory 512 (which may be the same or similar to the memory 114 of FIG. 1). The memory 512 may store data, including sequences of instructions, that may be executed by the CPU 502, or any other device included in the computing system 500. In one embodiment of the invention, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The MCH 508 may also include a graphics interface 514 that communicates with a display device 516. In one embodiment of the invention, the graphics interface 514 may communicate with the display device 516 via an accelerated graphics port (AGP). In an embodiment of the invention, the display 516 (such as a flat panel display) may communicate with the graphics interface 514 through, for example, a signal converter that translates a digital representation of an image stored in a storage device such as video memory or system memory into display signals that are interpreted and displayed by the display 516. The display signals produced by the display device may pass through various control devices before being interpreted by and subsequently displayed on the display 516.

A hub interface 518 may allow the MCH 508 and an input/output control hub (ICH) 520 to communicate. The ICH 520 may provide an interface to I/O device(s) that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and a network interface device 530 (which is in communication with the computer network 503). Other devices may communicate via the bus 522. Also, various components (such as the network interface device 530) may communicate with the MCH 508 in some embodiments of the invention. In addition, the processor 502 and other components shown in FIG. 5 (including but not limited to the MCH 508, one or more components of the MCH 508, etc.) may be combined to form a single chip. Furthermore, a graphics accelerator may be included within the MCH 508 in other embodiments of the invention.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 6:
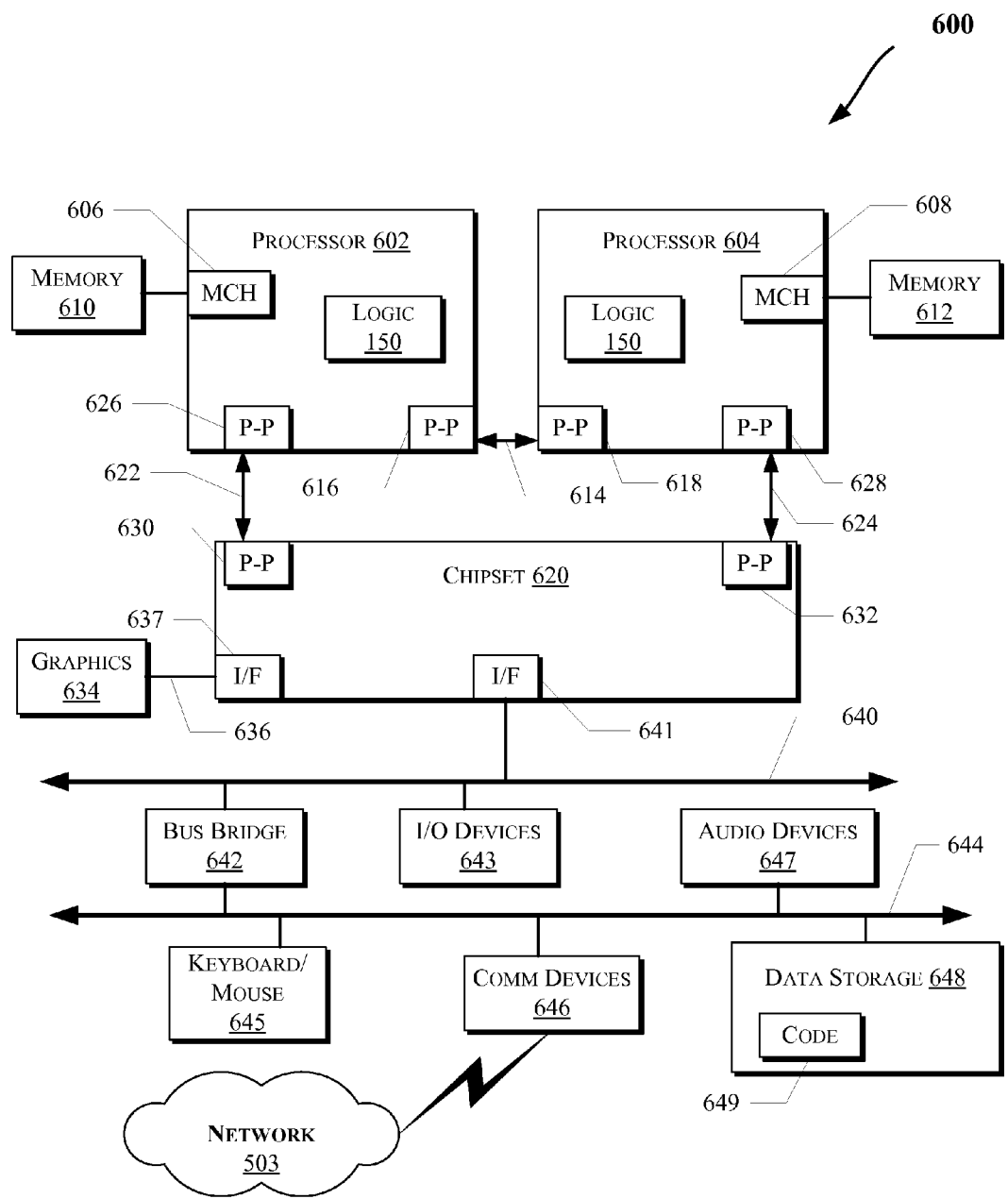

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 512 of FIG. 5.

In an embodiment, the processors 602 and 604 may be one of the processors 502 discussed with reference to FIG. 5, e.g., including one or more of the caches discussed with reference to FIGS. 1-5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a graphics circuit 634 via a graphics interface 636, e.g., using a PtP interface circuit 637.

At least one embodiment of the invention may be provided within the processors 602 and 604. For example, one or more of the cores 106 of FIG. 1 may be located within the processors 602 and 604. Also, processors 602 and 604 may include one or more of the caches, storage devices, and/or logic 150 discussed with reference to FIGS. 1-5. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The chipset 620 may communicate with a bus 640 using a PtP interface circuit 641. The bus 640 may communicate with one or more devices, such as a bus bridge 642 and I/O devices 643. Via a bus 644, the bus bridge 642 may communicate with other devices such as a keyboard/mouse 645, communication devices 646 (such as modems, network interface devices, or other communication devices that may communicate with the computer network 503), audio I/O device 647, and/or a data storage device 648. The data storage device 648 may store code 649 that may be executed by the processors 602 and/or 604.

Figure 7:
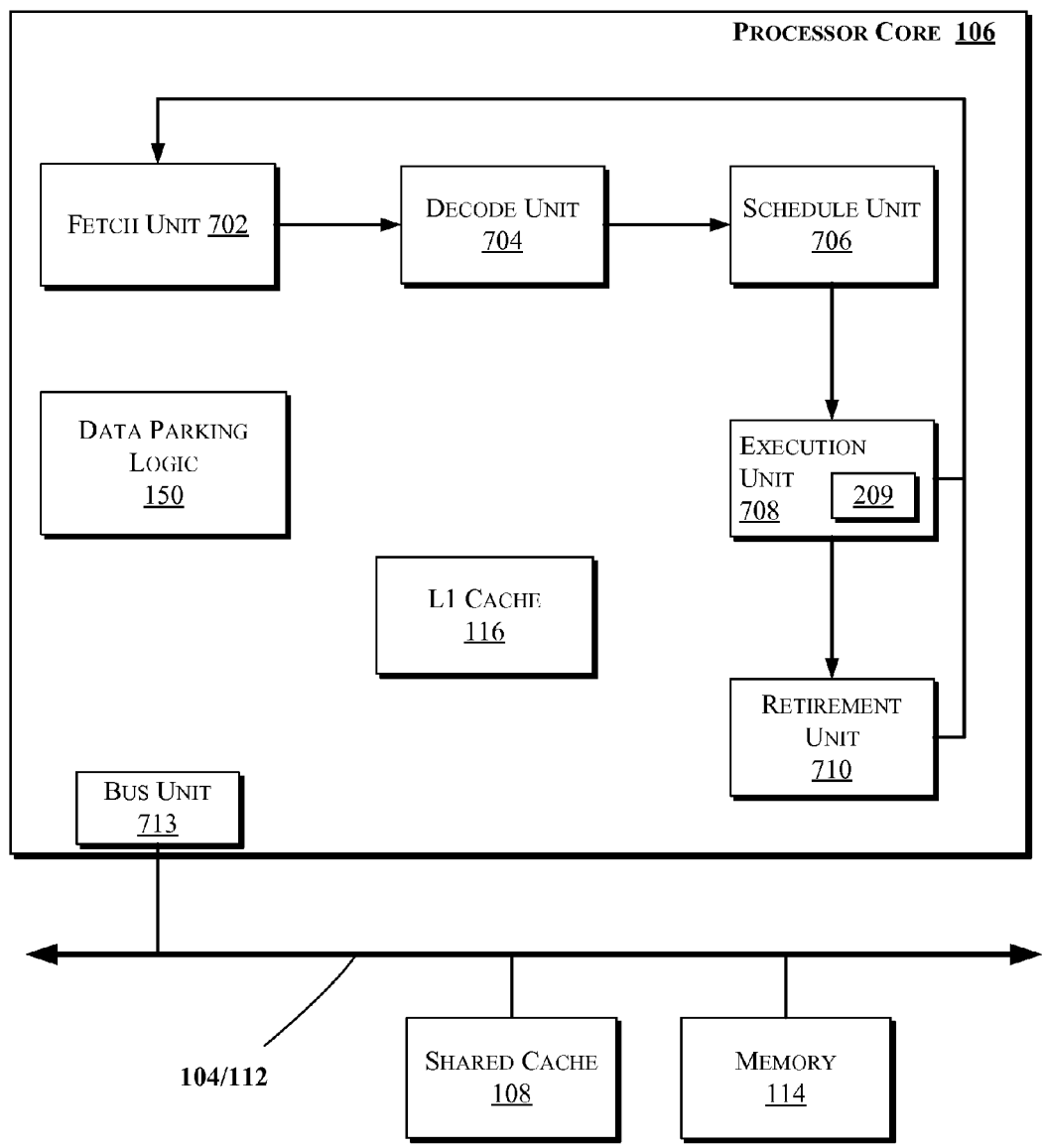
FIG. 7 illustrates a block diagram of portions of a processor core and other components of a computing system, according to an embodiment of the invention.

FIG. 7 illustrates a block diagram of portions of a processor core and other components of a computing system, according to an embodiment of the invention. In an embodiment, at least some of processors discussed herein (e.g., with reference to FIG. 1, 5, or 6) may include one or more of the component of the processor core 106 shown in FIG. 7. Also, a processor may include a single or multi-core 106, which may be homogeneous/symmetric or heterogeneous/asymmetric, etc. such as discussed herein, e.g., with reference to FIG. 1, 5, or 6. In one embodiment, the arrows shown in FIG. 7 illustrate the flow direction of instructions and/or data through the core 106. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnections (e.g., interconnections 104 and/or 112 of FIG. 1), memory controllers, or other components.

As illustrated in FIG. 7, the processor core 106 may include a fetch unit 702 to fetch instructions for execution by the core 106. The instructions may be fetched from any storage devices such as the memory 114 and/or the memory devices discussed with reference to FIG. 5 or 6. The core 106 may optionally include a decode unit 704 to decode the fetched instruction. In an embodiment, the decode unit 704 may decode the fetched instruction into a plurality of uops (micro-operations). Some embodiments of the processor core 106 may not include decode unit 704. Hence, the core 106 may process instructions without decoding them. Additionally, the core 106 may include a schedule unit 706. The schedule unit 706 may perform various operations associated with storing decoded instructions (e.g., received from the decode unit 704) until the instructions are ready for dispatch, e.g., until all source values of a decoded instruction become available.

In one embodiment, the schedule unit 706 may schedule and/or issue (or dispatch) decoded instructions to an execution unit 708 for execution. The execution unit 708 may execute the dispatched instructions after they are dispatched (e.g., by the schedule unit 706) and, if applicable, decoded (e.g., by the decode unit 704). In an embodiment, the execution unit 708 may include more than one execution unit, such as one or more memory execution units, one or more integer execution units, one or more floating-point execution units (209), or other execution units. The execution unit 708 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 708.

Further, the execution unit 708 may execute instructions out-of-order. Hence, the processor core 106 may be an out-of-order processor core in one embodiment. The core 106 may also include a retirement unit 710. The retirement unit 710 may retire executed instructions (e.g., in order) after they are committed. In an embodiment, retirement of the executed instructions may result in processor state being committed from the execution of the instructions, physical registers used by the instructions being de-allocated, etc.

The core 106 may further include the data parking logic 150 (such as the data parking logic 150 discussed with respect to any of the previous figures). Additionally, the core 106 may include a bus unit 713 to allow communication between components of the processor core 106 and other components (such as the components discussed with reference to FIG. 1, 5, or 6) via one or more buses (e.g., buses 104 and/or 112).

In various embodiments of the invention, the operations discussed herein, e.g., with reference to FIGS. 1-7, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed herein.

Additionally, such tangible computer-readable media may be downloaded as a computer program product, wherein the program may be transferred from a remote computer (e.g., a server) to a requesting computer (e.g., a client) by way of data signals in a propagation medium via a communication link (e.g., a bus, a modem, or a network connection).

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
    a first cache;
    a second cache; and
    a data parking logic to update a received prefetch request with one or more bits based on a status of a first request queue, corresponding to the first cache,
    wherein prefetched data is to be stored in one of the first cache or the second cache based on the one or more bits.

2. The apparatus of claim 1, further comprising a second request queue corresponding to the second cache.

3. The apparatus of claim 1, wherein the data parking logic is to update the received prefetch request with the one or more bits based on a status of a prefetch engine, wherein the prefetch engine is to generate the received prefetch request based on a prefetch trigger.

4. The apparatus of claim 3, wherein the prefetch engine is to comprise a plurality of detectors, wherein each of the plurality of detectors is to track demand requests corresponding to a portion of a storage device.

5. The apparatus of claim 4, wherein the prefetch engine is to issue prefetch requests, based on at least a demand request or prefetch request from a lower cache level, ahead of the demand requests to cause data to be stored in the second cache.

6. The apparatus of claim 3, wherein the pre fetch engine is to comprise the data parking logic.

7. The apparatus of claim 1, wherein the status of the first request queue is to indicate how full or how empty the first request queue is.

8. The apparatus of claim 1, wherein the first cache has a smaller size than the second cache.

9. The apparatus of claim 1, wherein the first cache is a level 1 cache and the second cache is either a mid-level cache or a last level cache.

10. The apparatus of claim 1, further comprising one or more processor cores, wherein at least one of the one or more processor cores is to comprise one or more of: the first cache, the second cache, or the data parking logic.

11. A method comprising:
receiving a prefetch request;
updating the received prefetch request with one or more bits based on a status of a first request queue, corresponding to a first cache, wherein prefetched data is to be stored in one of the first cache or a second cache, based on the one or more bits.

12. The method of claim 11, further comprising updating the received prefetch request with the one or more bits based on a status of a pre fetch engine, wherein the prefetch engine is to generate the received pre fetch request based on a prefetch trigger.

13. The method of claim 11, further comprising tracking demand requests corresponding to a portion of a storage device.

14. The method of claim 13, further comprising issuing prefetch requests, based on at least a demand request or prefetch request from a lower cache level, ahead of the demand requests to cause data to be stored in the second cache.

15. The method of claim 11, wherein the first cache is a level 1 cache and the second cache is either a mid-level cache or a last level cache.

16. A system comprising:
a memory to store an instruction; and
a processor to execute the instruction, the processor to comprise a first cache;
a second cache; and
a data parking logic to update a received prefetch request with one or more bits based on a status of a request queue, corresponding to the first cache, wherein prefetched data is to be stored in one of the first cache or the second cache based on the one or more bits.

17. The system of claim 16, wherein the processor is to comprise the second cache.

18. The system of claim 16, wherein the data parking logic is to update the received prefetch request with the one or more bits based on a status of a prefetch engine, wherein the prefetch engine is to generate the received prefetch request based on a prefetch trigger.

19. The system of claim 18, wherein the prefetch engine is to comprise a plurality of detectors, wherein each of the plurality of detectors is to track demand requests corresponding to a portion of a storage device, wherein the prefetch engine is to issue prefetch requests, based on at least a demand request or prefetch request from a lower cache level, ahead of the demand requests to cause data to be stored in the second cache.

20. The system of claim 16, further comprising an audio device coupled to the processor core.

* * * * *